United States Patent Office 2,950,633
Patented Aug. 30, 1960

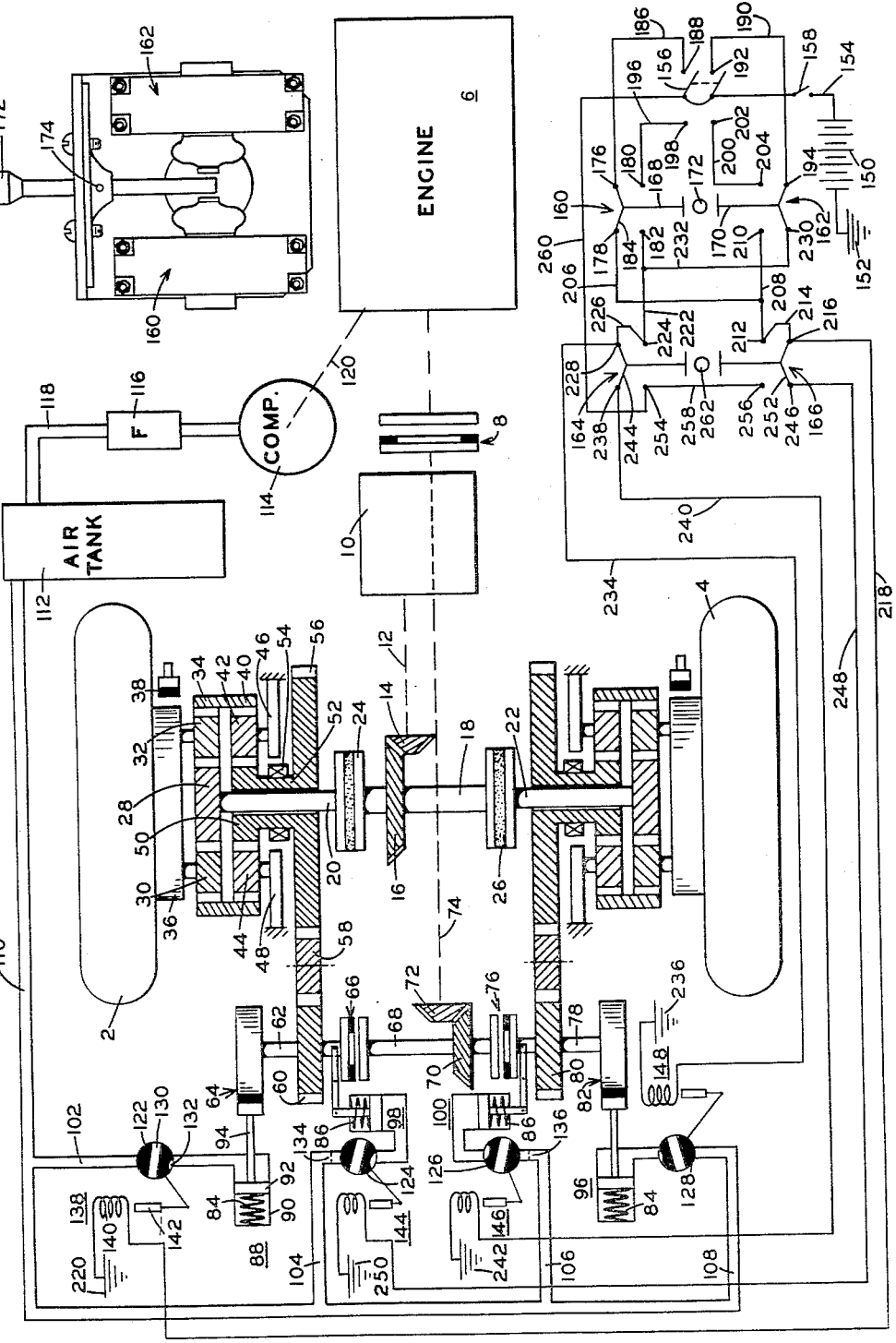

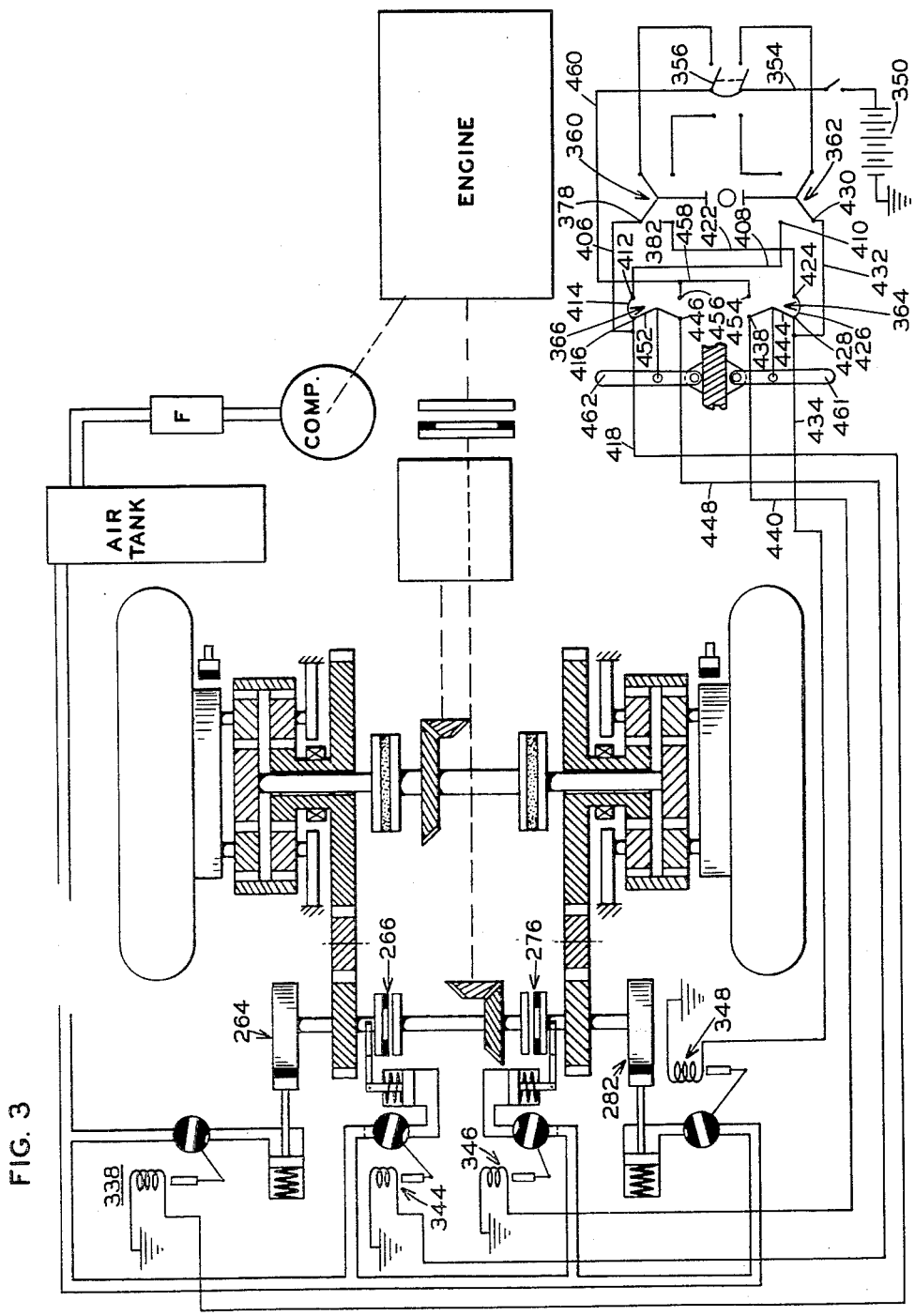

2,950,633
STEERING MECHANISM

John W. Goodrich, Peoria, Ill., assignor to LeTourneau-Westinghouse Company, Peoria, Ill., a corporation of Illinois Filed Nov. 24, 1958, Ser. No. 775,912

18 Claims. (Cl. 74—720.5)

This invention relates to a steering mechanism, and more particularly to steering mechanism as applied to tractors of the skid-steer type.

There are many skid-steer types of tractors in industry, and this is particularly true of the earthmoving industry. A long standing problem in directional control of skid-steer tractors is that of ability to steer the tractor by small and closely controlled amounts. Too often, the tractor "jumps" or lurches sideward by an amount which is difficult or impossible to predict by the operator. For tractors moving along a narrow roadway at fairly high speeds, this uncontrollability or unpredictability can be a source of serious trouble. For example, a tractor which is moved along a levee or along a shelf cut into the side of a mountain can easily be plunged over the side if the steering control is such as to cause the tractor to change direction by an unpredictable amount when the operator tries to steer it. This can of course result in injury or death to the operator and in severe damage to the equipment.

It is accordingly an object of this invention to provide steering mechanism for a tractor of the skid-steer type which gives the operator close control of the tractor and is at the same time no physical burden on him. This and other objects are accomplished in a tractor steering mechanism in which provision is made for driving the opposite sides of the tractor at different speeds, the invention providing means to control the different speeds at the will of the operator with a high degree of accuracy and with a minimum of physical effort.

In the drawings:

Fig. 1 is a schematic view showing two ground engaging members of a tractor, the means to drive the ground engaging members, and the steering controls therefor.

Fig. 2 is a view in elevation showing a pair of switches used in the steering mechanism and shown schematically in Fig. 1; and Fig. 3 is a schematic view somewhat similar to Fig. 1 but showing another embodiment of the steering control.

Referring now to Figs. 1 and 2 for a description of the embodiment there shown, ground engaging members 2 and 4 are shown and it will be understood by those skilled in the art that members 2 and 4 are mounted in any suitable manner on opposite sides of a tractor. The tractor may be one of a number of well-known types. If the invention is applied to a track-laying tractor, then the members 2 and 4 will be the tracks of the machine. However, the invention is not limited to tractors of the track-laying type; indeed, it is here shown as being applied to tractors of the rubber-tired type, as for example a four-wheel rubber-tired type, although the embodiment here illustrated shows only one ground engaging member on each side of the tractor.

The ground engaging members 2 and 4 are driven by an engine 6 which is connected to the ground engaging members by drive means which include a clutch 8 and a change-speeed transmission 10. The output shaft of transmission 10 is shown schematically at 12 and connects with a bevel pinion 14 to drive the pinion. Pinion 14 meshes with a bevel gear 16 which is mounted on a transverse drive shaft 18. At its ends, transverse shaft 18 connects with sun gear shafts 20 and 22 through flexible couplings 24 and 26. Inasmuch as the drive transmission on the two sides are the same, only one of them will be described in detail.

Sun gear shaft 20 carries at its outer end a sun gear 28. Sun gear 28 forms part of a planetary gear train having one or more planetary gears (the drawing shows two) 30 and 32. The planetary gears in turn mesh with a ring gear 34. The axes of planetary gears 30 and 32 are mounted on a planet carrier 36 which also serves as a brake drum for a brake here shown schematically at 38. Planet carrier 36 is connected to drive wheel 2. The planet carrier may be mounted integral with wheel 2 or the two members may be secured together in such a way as to permit a limited amount of relative radial movement while at the same time preventing relative rotary movement. Drives of this nature are old in the art and need not be disclosed here.

Mounted adjacent the planetary gear train just described is another gear train which looks like a planetary gear train but which will here be referred to simply as a gear train because the planet carrier thereof is permanently secured against rotation. More specifically, ring gear 34 is formed integral with another ring gear 40 which meshes with one or more pinions 42 and 44; pinions 42 and 44 are secured against rotation by mounting means 46 and 48, these mounting means being here shown schematically as secured in any suitable manner to some portion of the tractor frame, the axle housing, or the like. A centrally disposed gear 50 meshes with pinions 42 ant 44 and is substantially coaxial with sun gear 28.

As here shown, central gear 50 is formed integral with a shaft 52. Shaft 52 is mounted for rotation in a suitable bearing shown schematically at 54.

Also formed integral with shaft 52 is another gear 56. Gear 56 meshes with an idler gear 58 which in turn meshes with a gear 60. Gear 60 is secured on a shaft 62. At one end of shaft 62, there is provided a brake device 64, and at the other end of shaft 62 there is provided a clutch device 66.

Clutch device 66 permits driving of shaft 62 by means of a shaft 68 on which there is secured a bevel gear 70. A bevel pinion 72 meshes with and drives gear 70. Gear 72 is connected to be driven by engine 6 through a shaft shown schematically at 74. Shaft 74 is schematically shown as passing "straight through" change speed transmission 10. This is intended to indicate that shaft 74 is not affected by gear changes. Instead, for any given engine speed, shaft 74 runs at a constant speed so long as clutch 8 is engaged.

Reference was made above to the clutch device 66 which permits driving of shaft 62 by shaft 68. A second clutch device 76 is mounted at the opposite end of shaft 68 and enables shaft 68 to drive a shaft 78 on which there is secured a gear 80. Gear 80 is associated with ground engaging member 4 in the same manner that gear 60 is associated with ground engaging member 2. A brake device 82 is also secured to shaft 78.

The drive mechanism described above is fully disclosed and claimed in copending application Ser. No. 560,964 of Ralph B. Clark and Ernst W. Spannhake, filed January 24, 1956, and assigned to the assignee of this application.

Actuating means are provided for the clutch and brake devices 66, 76, and 64, 82 referred to above. In the embodiment shown, the brake devices are designed to be normally engaged while the clutch devices are designed to be normally disengaged. Toward that end, springs 84 are disposed to engage the brake devices, and springs 86 are disposed to disengage the clutch devices. In the embodiment shown, the actuating means are fluid pressure operated. More specifically, the actuating means consist of pneumatic motors. Thus, the actuating means 88 for brake device 64 consists of a pneumatic motor having a cylinder 90, a piston 92, and a piston rod 94, rod 94 being connected with the brake shoe of the brake device 64. It will of course be understood by those skilled in the art that the showing here is purely schematic. Furthermore, it will also be understood that the spring 84 may be disposed where the designer sees fit to put it. For reasons of convenience, the springs 84 and 86 are here shown as located within the pneumatic cylinders. Actuating means 96 is shown connected to operate brake device 82. Actuating means 98 is shown connected to operate clutch device 66, and actuating means 100 is shown connected to operate clutch device 76.

In view of the statement above to the effect that the brake devices are normally engaged and the clutch devices are normally disengaged, it will be understood that the fluid pressure connections are such that the admission of fluid under pressure to a brake device serves to disengage the brake, while the admission of fluid under pressure to a clutch device serves to engage the clutch. For that purpose, fluid pressure connections 102, 104, 106, and 108 are provided for the clutch and brake device actuating means 88, 98, 100, and 96 respectively.

Fluid under pressure is supplied to the aforementioned fluid pressure connections by means of a pressure line 110 which receives fluid under pressure from a tank 112. Tank 112 is supplied with fluid under pressure by a suitable pump 114 through a filter 116 and a conduit 118. Pump 114 is connected to be driven by engine 6 through any suitable conventional drive, here shown schematically at 120.

The actuating means are electrically controlled in the embodiment shown. For that purpose, valves 122, 124, 126, and 128 are shown in the fluid pressure connections 102, 104, 106, and 108 respectively. As here shown, these valves are of course purely schematic, and each valve is provided with a straight through passage 130 and an exhaust passage 132.

It may be pointed out here that the exhaust passages for valves 122 and 128 are considerably smaller than the exhaust passages for the valves 124 and 126. The purpose of this difference is to provide a time delay in the application of the brakes of devices 64 and 82. Similarly, orifices 134 and 136 are provided in the fluid pressure connections 104 and 106 in order to provide a time delay in the application of the clutches of devices 66 and 76.

The aforesaid valves 122, 124, 126, and 128 are connected to be electrically operated. Thus, a solenoid 138 having a coil 140 and an armature 142 is connected to operate valve 122. Similarly solenoids 144, 146, and 148 are connected to operate valves 124, 126, and 128 respectively.

Operator-operable means are provided to control the solenoids 138, 144, 146, and 148. A source of electric power such as a storage battery 150 is provided to furnish the electric power necessary to operate the solenoids. The battery 150 is preferably the storage battery which is conventionally used in tractors of this type. One terminal of the battery is grounded as shown at 152. The other terminal of the battery is connected by a conduit 154 with a double-pole double-throw switch 156. A simple on-off switch 158 is provided in conduit 154; switch 158 can be connected to be turned on and off with the ignition of engine 6. Alternatively, a separate and different lock may be provided for switch 158, as will be understood by those skilled in the art.

Switch 156 is one of a number of control switches in the over-all electrical control means of the tractor steering mechanism. In addition to switch 156, there is shown in Fig. 1 a pair of switches 160, 162 and a second pair of switches 164, 166. Each of the switches 160, 162, 164, and 166 is preferably of a type disclosed in Patent 2,629,791, LeTourneau, dated February 24, 1953. The switches 160, 162 are preferably mounted with their operating plungers opposed to each other as shown at 168 and 170 respectively. An operating lever 172 is disposed between the ends of plungers 168 and 170.

As is best seen in Fig. 2, the switches are preferably mounted on any suitable panel. The operating lever 172 is pivoted at 174 so that movement of the upper end of lever 172 to the left as seen in Fig. 2 serves to operate the switch on the right, namely switch 162. Moreover, it will be noted that such movement of the upper end of lever 172 to the left moves the lower end of the lever away from switch 160. Accordingly, movement of lever 172 to operate switch 162 necessarily excludes the operation of switch 160. Similarly, with this arrangement, the operation of switch 160 by lever 172 would exclude the operation of switch 162.

Switches 164 and 166 may be mounted in a manner similar to switches 160 and 162. Accordingly, the mounting of those switches need not be discussed in detail here.

Inasmuch as switches 160, 162, 164, and 166 are substantially alike, it will suffice to describe one of them. Moreover, because the structure of one of these switches is shown in detail in the above-identified LeTourneau patent, it will not be necessary to describe the switches here in any great detail.

Each of the switches provides a normally closed circuit and a normally open circuit. Thus, switch 160 has four fixed contacts 176, 178, 180, and 182. A movable bridging contact 184 is provided. As will be seen from a consideration of the above-identified patent, the bridging contact 184 moves with a snap action, being an over-center device. As switch 160 is shown in Fig. 1, the normally closed circuit consists of fixed contact 176, bridging contact 184, and fixed contact 178, while the normally open circuit consists of fixed contacts 180 and 182. Actuation of the plunger 168 operates the over-center device so that bridging contact 184 disengages itself from fixed contacts 176, 178, and engages fixed contacts 180, 182.

Switch 156 is connected with the first-named pair of switches 160, 162 by means of a conduit 186 connecting contact 188 with contact 176, and conduit 190 connecting contact 192 with a fixed contact 194 of switch 162, contact 194 corresponding to contact 176 of switch 160. The connection of switch 156 with switches 160, 162 just described is with the normally closed circuit of those switches. Switch 156 is also connected with the normally open circuits of those switches. This connection is accomplished by a conduit 196 connecting a contact 198 of switch 156 with contact 180 of switch 160. A conduit 200 connects a contact 202 of switch 156 with a contact 204 of switch 162, contact 204 corresponding to contact 180 of switch 160.

The normally closed circuit of each of switches 160, 162 is connected to control the drive means of one ground engaging member, while the normally open circuit of the switch is connected to control the drive means of the other ground engaging member. In the embodiment shown, these connections are accomplished through the second-named pair of switches 164, 166.

More specifically, the normally closed circuit of switch 160 includes fixed contact 178. A conducit 206 is connected with fixed contact 178 and with another conduit 208, conduit 208 connecting a fixed contact 210 of switch 162 with a fixed contact 212 of switch 166. A jumper connection 214 connects fixed contact 212 of switch 166 with a fixed contact 216 of the same switch 166. A conduit 218 connects at its one end with fixed contact 216 and at its other end with one end of coil 140, the other end of the coil being grounded as shown at 220.

The aforementioned conduit 208 connects the normally open circuit of switch 162 with switch 166 and solenoid 138 as will by now be understood by those skilled in the art from the foregoing description.

The normally open circuit of switch 160 is connected with the normally open and the normally closed circuits of switch 164. To accomplish this connection, a conduit 222 connects fixed contact 182 of switch 160 with a fixed contact 224 of switch 164. A jumper connection 226 electrically joins the fixed contact 224 of switch 164 with a fixed contact 228.

The normally closed circuit of switch 162 is connected with switch 164; thus, a fixed contact 230 of switch 162 is connected with conduit 222 by a conduit 232. Thus the normally closed circuit of switch 162 is connected with switch 164 and with the controls for the actuating means associated with the drive means for ground engaging member 4.

To accomplish this connection, a conductor 234 is connected at its one end to fixed contact 228 of switch 164 and at its other end is connected with one end of the coil of solenoid 148. The other end of the coil being grounded as shown at 236. Another fixed contact 238 of switch 164 is connected with one end of a conductor 240 of which the other end is connected with the coil of solenoid 146. The coil is grounded as shown at 242. The fixed contacts 228 and 238 form, with a bridging contact 244, a normally closed circuit of switch 164.

In like manner, switch 166 is connected with solenoid 138 as detailed above. Another fixed contact 246 of switch 166 is connected to one end of a conductor 248 of which the other end is connected with the coil of solenoid 144; the coil is grounded as shown at 250. Fixed contacts 216 and 246 of switch 166 form, with a bridging contact 252, a normally closed circuit for switch 166.

Switches 164 and 166 also have normally open circuits. Fixed contact 224 of switch 164 and a fixed contact 254 form the normally open circuit. As for switch 166, fixed contact 212 and a fixed contact 256 form a normally open circuit. A conductor 258 connects the fixed contacts 254 and 256. A conductor 260 connects fixed contact 254 with switch 156 and, through switch 156, with conductor 154 and battery 150.

An operating lever 262 is disposed between switches 164 and 166 in much the same manner as operating lever 172 is disposed between switches 160 and 162.

*The embodiment of Figure 3*

Reference will now be had to the embodiment shown in Fig. 3. The description of this embodiment will be concerned only with the differences between the two forms which the invention takes.

Whereas the embodiment shown in Fig. 1 controls the switches 164 and 166 by the same manual means as is provided for the switches 160 and 162, in the embodiment shown in Fig. 3, different means are provided to control the second pair of switches.

In the Fig. 3 embodiment, the second pair of switches is shown at 364 and 366, these switches being adapted to be operated by levers 461 and 462, these levers being pivotally mounted on any convenient portion of the frame. Lever 461 is connected to actuate the bridging contact 444 of switch 364, and lever 462 is connected to actuate bridging contact 452 of switch 366.

Switches 364 and 366 are connected with the first pair of switches 360 and 362 in much the same manner as in Fig. 1; however, the physical orientation of the switches differs somewhat because of the means of control, and as a result the connections appear to be different.

Fixed contact 378 of switch 360 is part of the normally closed circuit of that switch and is connected with both circuits of switch 366. To accomplish this connection, a conductor 406 is connected with fixed contact 416 by way of a portion of conductor 418. The connection also goes to fixed contact 412 by way of the jumper connection 414. It will be recognized that the normally closed circuit of switch 366 comprises fixed contact 416, bridging contact 452, and fixed contact 446. The normally open circuit of switch 366 comprises the aforementioned fixed contact 412 and another fixed contact 456. The normally open and normally closed circuits of switch 366 are connected with fixed contact 410 of switch 362 by means of conductor 408.

The normally closed circuit of switch 362 is connected with both circuits of switch 364. To accomplish this connection, fixed contact 430 of switch 362 is connected by a conductor 432 with fixed contact 428 of switch 364 by way of a portion of conductor 434, and it is also connected with fixed contact 424 by way of the jumper connection 426. Fixed contact 424 is connected with the normally open circuit of switch 360 by the connection of conductor 422 with fixed contact 424 of switch 364 and fixed contact 382 of switch 360.

Switch 364 is thus provided with a normally closed circuit and a normally open circuit, normally closed circuit comprising fixed contact 428, bridging contact 444, and fixed contact 438; the normally open circuit comprises fixed contact 424 and fixed contact 454.

The normally open circuits of switches 364 and 366 are connected with switch 356 by means of the connection of fixed contacts 454 and 456 with conductors 458 and 460, and through switch 356, with conductor 354 and power source 350.

The remainder of the embodiment shown in Fig. 3 is sufficiently similar to that of Fig. 1 to require very little additional description. Thus, the aforementioned conductors 418 and 434 are connected with solenoids 338 and 348 respectively, these being the solenoids which control brake devices 264 and 282 respectively. In addition, one end of a conductor 448 is connected with fixed contact 446, and the other end of the conductor is connected with solenoid 344; and one end of a conductor 440 is connected with fixed contact 438, while its other end is connected with solenoid 346. Solenoid 344 controls clutch device 266, and solenoid 346 controls clutch device 276.

*Operation*

Reference will be made to the embodiment seen in Fig. 1 for a description of the operation. The gear trains shown to drive a ground engaging member are so arranged that the drive axle is in the high range when brake devices 64 and 82 are engaged. In these circumstances, ground engaging member 2 is driven by the planet carrier 36, the axes of planet gears 30, 32 revolving about the axis of sun gear 28. Sun gear 28 is driven by engine 6 through change-speed transmission 10 at the gear ratio selected by the operator. Ring gear 34 is stationary because it is integral with ring gear 40 and ring gear 40 is held against rotation under these circumstances because gear 56 is held against rotation by brake device 64.

If now the brake device 64 is disengaged and if clutch device 66 is engaged, gear 56 will be rotated through the power train shown. The rotation of gear 56 is such as to slow down the rotation of planet carrier 36, as will be understood by those skilled in the art. It will of course be understood that the amount that planet carrier 36 is slowed down will depend upon the gear ratio selected by the operator as he manipulates transmission 10, inasmuch as the rotational speed of shaft 74 is not affected by gear changes selected by the operator. In other words, in the lowest gear selection for transmission 10, the rotation of ring gear 34 will come close to offsetting rotation of planet carrier 36.

The power train which drives ground engaging member 4 is the same as the power train for member 2, so no attempt will be made to describe the operation of the drive for member 4 in detail.

Let it be assumed that the vehicle is moving forward and that the forward motion is to the right as seen in Fig. 1. Let it be further assumed that switch 156 is closed so that contacts 188 and 192 are engaged. It is also assumed that switch 158 is closed. Under these conditions, power is supplied to all four solenoids.

More specifically, looking first at the circuit for switch 160, the circuit is traceable as follows: power source 150, conductor 154, switch 156, conductor 186, the normally closed circuit of switch 160, conductor 206, conductor 208, the normally closed circuit of switch 166, and conductors 218 and 248 to solenoids 138 and 144 respectively. Similarly, completed circuits can be traced through switches 162 and 164 to solenoids 146 and 148.

With all of the solenoids energized, valves 122, 124, 126, and 128 are operated to admit fluid under pressure to the air motors 88, 98, 100, and 96 respectively.

Brake devices 64 and 82 are thereupon released or disengaged, while clutch devices 66 and 76 are engaged. It should be noted that there is no impediment to the immediate operation of the brake devices. However, the orifices 134 and 136 serve to delay the operation of clutch devices 66 and 76, in order to insure that the brake devices are fully disengaged before the clutch devices are engaged.

With all of the solenoids energized, the drive axle operates in the low range. Let it now be assumed that the operator wishes to steer the vehicle to the left. Referring now to Fig. 2, note that the operator moves the handle 172 to the left as seen in Fig. 2. Inasmuch as switch handle 172 is pivoted at 174, switch 162 is engaged by this manipulation.

Referring now again to Fig. 1, it will be noted that the operation of switch 162 interrupts the normally closed circuit of that switch, interrupting the flow of power to switch 164 and solenoids 146 and 148. With these two solenoids deenergized, valves 126 and 128 return to the position shown in the drawing. Spring 86 disengages clutch device 76 and spring 84 engages brake device 82. It may be noted however that the exhaust port in valve 128 is quite restricted, and the purpose of this is to insure that the application of brake device 82 will be delayed until clutch device 76 has become fully disengaged.

Under these conditions, the drive for ground engaging member 4 is shifted into the high range. The drive for ground engaging member 2 continues in the low range. With ground engaging member 4 running faster than ground engaging member 2, the vehicle steers to the left.

Steering of the vehicle to the right will easily be understood by those skilled in the art from the above description and will not be detailed here.

Let it now be assumed that switch 156 is manipulated to engage fixed contacts 198 and 202. In this operating position of switch 156 it will be noted that there is no voltage applied to the normally closed circuits of switches 160 and 162. Instead, voltage is applied to the normally open circuits of those switches by way of conductors 196 and 200. However, with switches 160 and 162 in their normal operating positions as shown in Fig. 1, the circuits are open so the application of voltage to contacts 180 and 204 accomplishes nothing at this time.

With switch 156 engaging fixed contacts 198 and 202, all of the solenoids are de-energized and the parts assume the operating position shown in Fig. 1. As will be understood from the above explanation, the drive axle is now in high range.

Let it now be assumed that the operator wishes to steer the vehicle while the driving axle is in high speed range. Again let it be assumed that he wishes to steer to the left. Again, switch 162 is operated so that the bridging contact forms a closed circuit of the fixed contacts 204 and 210. There is then an electric circuit as follows: power source 150, conductor 154, switch 156, conductor 200, contacts 204 and 210 of switch 162, conductor 208, switch 166, and conductors 218 and 248 to solenoids 138 and 144 respectively. With solenoids 138 and 144 energized, the drive means for ground engaging member 2 is shifted from the high range it was in, to the low range as is explained above. Inasmuch as ground engaging member 4 continues in the high range, member 4 runs faster than member 2, and the vehicle steers to the left.

Steering of the vehicle to the right under these conditions will be understood from the foregoing and need not be set forth in detail here.

The steering operations thus far described are for what is sometimes called "power steering" because it is accomplished by actually driving the outside wheel at a higher rate of speed than the drive for the inside wheel. As shown here, the invention provides still another method of steering, called "skid-steering" because the inside wheel is completely disengaged from its drive so that it may be braked. Skid-steering is accomplished through the switches 164 and 166 by means of the operating handle 262. Inasmuch as switches 164 and 166 are mounted in relation to handle 262 in much the same manner as the switches shown in Fig. 2, it will of course be understood that movement of handle 262 upward as seen in Fig. 1 will operate switch 166. Accordingly, let it be assumed that switch 166 is thus operated in order to steer to the left. What happens is that the normally closed circuit of switch 166 is broken and a circuit is established across fixed contacts 212 and 256. When the normally closed circuit of switch 166 is broken, fixed contact 246 is isolated so that, no matter what the operating condition of the vehicle is otherwise, conductor 248 is "dead" and solenoid 144 is de-energized; the result is that clutch device 66 is disengaged—whether it was previously engaged or not. Meanwhile, a circuit is provided for solenoid 138 as follows: power source 150, conductor 154, the jumper of switch 156, conductors 260 and 258, contacts 256 and 212 of switch 166, and conductors 214 and 218 to the coil of solenoid 138. As a result, solenoid 138 is energized regardless of its condition before the operator manipulated handle 262. As a consequence of the manipulation of handle 262 just described, solenoid 138 is energized to release brake device 64 but solenoid 144 is de-energized to disengage clutch device 66, with the result that there is no reaction member for the gear train which comprises pinions 42 and 44. The necessary consequences of this condition is that the drive for ground engaging member 2 is completely disconnected. The operator is thereupon free to engage brake 38 with the planet carrier 36 to stop ground engaging member 2 and accomplish what is known as "skid-steering" because ground engaging member 4 is still connected. The vehicle thus steers to the left.

Skid-steering of the vehicle to the right is of course similar to the steering operation to the left just described, so it is not necessary to go into detail on the method of the steering to the right.

The operation of the embodiment shown in Fig. 3 is substantially the same as the operation just described of the embodiment shown in Fig. 1, except that the skid-steering switches 364 and 366 are operated by means of separate levers 461 and 462 respectively. Skid-steering of the embodiment shown in Fig. 3 is accomplished by individual manipulation of lever 461 or lever 462, at the will of the operator. There is one feature of the Fig. 3 embodiment which is not present in the Fig. 1 embodiment. Whereas only one of the two switches 164 and 166 can be actuated at a time, the corresponding switches 364 and 366 in Fig. 3 may be actuated simultaneously to permit complete disengagement of the vehicle drive by means of the steering switches. In some conditions of operation, this feature may have a definite advantage.

It will be evident from the foregoing that the invention provides steering mechanism for a tractor or other vehicle which gives the operator close control but without imposing any physical burden on him. Other advantages will be apparent to those skilled in the art.

While there are in this application specifically described two forms which the invention may assume in practice, it will be understood that these forms are shown for purposes of illustration and that the invention may be modified and embodied in various other forms without departing from its spirit or the scope of the appended claims.

What is claimed is:

1. Steering mechanism for a tractor having a ground engaging member at each side thereof, the means to drive each ground engaging member in a high speed range and a low speed range, comprising electrically controlled actuating means to connect a drive means in either speed range, a pair of switches, each switch having a normally closed circuit connected to control the drive means of one ground engaging member and a normally open circuit connected to control the drive means of the other ground engaging member, means selectively to apply voltage to the normally closed circuits of the pair of switches or the normally open circuits thereof at the will of an operator, and means to operate the pair of switches.

2. Steering mechanism as in claim 1, in which the last-named means is operable to operate either switch to the exclusion of the other.

3. Steering mechanism as in claim 2, and another pair of switches each of which has a normally open circuit and a normally closed circuit, each of said other pair of switches having a connection with a circuit of each of the first-named pair of switches.

4. Steering mechanism as in claim 1, and another pair of switches each of which has a normally open circuit and a normally closed circuit, each of said other pair of switches having a connection with a circuit of each of the first-named pair of switches.

5. Steering mechanism as in claim 1, and another pair of switches each of which has a normally open circuit and a normally closed circuit, each of said other pair of switches having a connection with the normally open circuit of one of the first-named pair of switches and with the normally closed circuit of the other of the first-named pair of switches.

6. Steering mechanism as in claim 1, and another pair of switches each of which has a normally open circuit and a normally closed circuit, each circuit of each of said other pair of switches having a connection with the normally open circuit of one of the first-named pair of switches and with the normally closed circuit of the other of the first-named pair of switches.

7. Steering mechanism for a tractor having a ground engaging member at each side thereof, and means to drive each ground engaging member in a high speed range and a low speed range, comprising electrically controlled actuating means to connect a drive means in either speed range, a switch having high speed and low speed operating positions, a pair of switches connected with the first named switch and with the electrically controlled actuating means and each switch of the pair providing a pair of circuits and corresponding operating positions to make or break those circuits, and means to operate the pair of switches to steer the tractor.

8. Steering mechanism for a tractor having a ground engaging member at each side thereof, and means to drive each ground engaging member in a high speed range and a low speed range, comprising electrically controlled actuating means to connect a drive means in either speed range, a switch having high speed and low speed operating positions, a pair of switches connected with the first-named switch and with the electrically controlled actuating means and each switch of the pair providing a pair of circuits and corresponding operating positions to make or break those circuits, and means to operate one of the pair of switches to the exclusion of the other to steer the tractor.

9. Steering mechanism for a tractor having a ground engaging member at each side thereof, and means to drive each ground engaging member in a high speed range and a low speed range, comprising electrically controlled actuating means to connect a drive means in either speed range, a switch having high speed and low speed operating positions, a pair of switches connected with the first-named switch and with the electrically controlled actuating means and each switch of the pair providing a normally closed circuit and a normally open circuit and corresponding operating positions to make or break those circuits, and means to operate the pair of switches to steer the tractor.

10. Steering mechanism as in claim 7, and a second pair of switches connected with the drive means and with the first-named pair of switches, each switch of the second-named pair providing a circuit operable to control disconnection of one of the ground engaging members from its drive means, and means selectively to operate one of the second-named pair of switches.

11. Steering mechanism for a tractor having a ground engaging member at each side thereof, and means to drive each ground engaging member including a clutch device and a brake device, comprising: electrically controlled actuating means for each device; a pair of switches, each switch having a normally closed circuit connected to control the devices of one drive means and a normally open circuit connected to control the devices of the other drive means; means selectively to apply voltage to the normally closed circuits of the pair of switches or to the normally open circuits thereof at the will of an operator; and means to operate the pair of switches.

12. Steering mechanism as in claim 11, and a second pair of switches, each switch having a normally open circuit and a normally closed circuit connected in parallel; means connecting the second pair of switches with the devices; other means connecting the parallel circuits of each switch with the normally open circuit of one of the first-named pair of switches and with the normally closed circuit of the other of the first-named pair of switches; and means to operate the second pair of switches.

13. A tractor having a ground engaging member at each side, drive means for each ground engaging member including a brake device and a clutch device whereby engagement of one device and disengagement of the other permits drive of the associated ground engaging member in a low speed range or a high speed range depending upon which device is engaged and which is disengaged by the operator, and a stopping brake for each ground engaging member, the invention comprising: electrically controlled actuating means for said devices; a switch having high speed and low speed operating positions; a pair of switches connected with the first-named switch and with the actuating means, each switch of the pair providing a pair of circuits and corresponding operating positions to make or break those circuits; means to operate the switches to control steering of the tractor by permitting the driving of one ground engaging member faster than the other; a second pair of switches connected with the actuating means and with the first-named pair of switches, each switch of the second-named pair providing a circuit which controls disconnection of one of the ground engaging members from its drive means to permit steering by braking the disconnected ground engaging member; and means to operate the second-named pair of switches.

14. A tractor having a ground engaging member at each side, and drive means for each ground engaging member including a brake device and a clutch device whereby engagement of one device and disengagement of the other drives the associated ground engaging member in a low speed range or a high speed range depending upon which device is engaged and which is disengaged by the operator, the invention comprising: electrically controlled actuating means for said devices; a switch having high speed and low speed operating positions; a pair of switches connected with the first-named switch and with the actuating means, each switch of the pair providing a pair of circuits and corresponding operating positions to make or break those circuits; and means to operate the switches to steer the tractor by driving one ground engaging member faster than the other.

15. A tractor having a ground engaging member at each side, drive means for each ground engaging member including a normally engaged brake device and a normally disengaged clutch device whereby engagement of one device and disengagement of the other drives the associated ground engaging member in a low speed range or a high speed range depending upon which device is engaged, fluid pressure operated actuating means to disengage each brake and engage each clutch, a source of electric power, a switch having high speed and low speed operating positions and connected to the power source, a pair of switches connected with the first-named switch and with the fluid pressure operated actuating means and each switch of the pair providing a pair of circuits and corresponding operating positions to make or break those circuits, and means to operate the pair of switches to steer the tractor.

16. A tractor as in claim 15, a stopping brake for each ground engaging member, a second pair of switches connected with the first-named pair of switches and with the actuating means, each switch of the second pair providing a circuit operable to cause disconnection of one of the ground engaging members completely from its drive means, and means selectively to operate one of the second pair of switches to permit steering by braking the disconnected member.

17. A tractor having a ground engaging member at each side, drive means for each ground engaging member including a brake device and a clutch device whereby engagement of one device and disengagement of the other drives the associated ground engaging member in a low speed range or a high speed range depending upon which device is engaged, fluid pressure operated actuating means to operate the brake and clutch devices, a source of electric power, a switch having high speed and low speed operating positions and connected to the power source, a pair of switches connected with the first-named switch and with the fluid pressure operated actuating means and each switch of the pair providing a normally closed circuit connected with the actuating means for the clutch and brake devices associated with one drive means and a normally open circuit connected with the actuating means for the clutch and brake devices associated with the other drive means and having corresponding operating positions to make or break those circuits, and means to operate the pair of switches to control steering of the tractor.

18. A tractor as in claim 17, a stopping brake for each ground engaging member, a second pair of switches connected with the first-named pair of switches and with the actuating means, each switch of the second pair providing a circuit operable to control disconnection of one of the ground engaging members completely from its drive means, and means selectively to operate one of the second pair of switches to permit steering by braking the disconnected member.

References Cited in the file of this patent
UNITED STATES PATENTS

| | | |
|---|---|---|
| 2,583,065 | Stephan | Jan. 22, 1952 |
| 2,655,054 | Kelley | Oct. 13, 1953 |
| 2,689,488 | Storer et al. | Sept. 21, 1954 |
| 2,706,419 | Kelbel | Apr. 19, 1955 |
| 2,757,513 | Banker | Aug. 7, 1956 |
| 2,781,858 | Kelley et al. | Feb. 19, 1957 |
| 2,795,963 | Alfieri | June 18, 1957 |

UNITED STATES PATENT OFFICE

CERTIFICATION OF CORRECTION

Patent No. 2,950,633                                  August 30, 1960

John W. Goodrich

It is hereby certified that error appears in the above numbered patent requiring correction and that the said Letters Patent should read as corrected below.

In the drawings, Sheet 2, Fig. 3, the conduit shown at the top of Fig. 3 is broken or interrupted and should be shown as one continuous conduit; in the printed specification, column 2, line 35, for "ant" read -- and --; column 9, line 16, for "the" read -- and --.

Signed and sealed this 25th day of April 1961.

(SEAL)
Attest:

ERNEST W. SWIDER
Attesting Officer

DAVID L. LADD
Commissioner of Patents